(12) United States Patent
Allen et al.

(10) Patent No.: US 8,205,137 B2
(45) Date of Patent: *Jun. 19, 2012

(54) APPARATUS FOR THE RELIABILITY OF HOST DATA STORED ON FIBRE CHANNEL ATTACHED STORAGE SUBSYSTEMS

(75) Inventors: James Patrick Allen, Austin, TX (US); Thomas Stanley Mathews, Austin, TX (US); Ravi A. Shankar, Austin, TX (US); Satya Prakash Sharma, Austin, TX (US); Glenn Rowan Wightwick, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 833 days.

This patent is subject to a terminal disclaimer.

(21) Appl. No.: 12/276,879

(22) Filed: Nov. 24, 2008

(65) Prior Publication Data
US 2009/0077661 A1 Mar. 19, 2009

Related U.S. Application Data

(63) Continuation of application No. 11/189,895, filed on Jul. 26, 2005, now Pat. No. 7,472,332.

(51) Int. Cl.
*G11C 29/00* (2006.01)
(52) U.S. Cl. .................................. 714/763; 714/768
(58) Field of Classification Search .................. 714/763, 714/768, 752, 758
See application file for complete search history.

(56) References Cited

U.S. PATENT DOCUMENTS

| | | | |
|---|---|---|---|
| 4,414,669 A | 11/1983 | Heckelman et al. | |
| 4,727,548 A | 2/1988 | Dickey | |
| 4,757,440 A | 7/1988 | Scheuneman | |
| 4,962,501 A | 10/1990 | Byers et al. | |
| 5,021,997 A | 6/1991 | Archie et al. | |
| 5,033,050 A | 7/1991 | Murai | |
| 5,072,450 A | 12/1991 | Helm et al. | |
| 5,699,531 A | 12/1997 | Takahashi | |
| 6,269,374 B1 | 7/2001 | Chen et al. | |
| 6,289,023 B1 | 9/2001 | Dowling et al. | |
| 6,345,368 B1 | 2/2002 | Bergsten | |
| 6,530,061 B1 | 3/2003 | Labatte | |
| 6,732,289 B1 | 5/2004 | Talagala et al. | |

(Continued)

OTHER PUBLICATIONS

USPTO Office Action for U.S. Appl. No. 11/189,895 dated Oct. 10, 2007, 12 pages.

(Continued)

*Primary Examiner* — Sam Rizk
(74) *Attorney, Agent, or Firm* — Yee & Associates, P.C.

(57) ABSTRACT

An apparatus for improving the reliability of host data stored on Fiber Channel attached storage subsystems by performing end-to-end data integrity checks. When a read or write operation is initiated, an initial checksum for data in the read/write operation is generated and associated with the data, wherein the association exists through a plurality of layers of software and attached storage subsystems. The initial checksum is passed with the data in the read/write path. When a layer of software in the read/write path receives the initial checksum and data, the layer performs an integrity check of the data, which includes generating another checksum and comparing it to the initial checksum. If the checksums do not match, the read/write operation fails and the error is logged. If the checksums match, the integrity check is repeated through each layer in the read/write path to enable detecting data corruption at the point of source.

18 Claims, 4 Drawing Sheets

U.S. PATENT DOCUMENTS

| | | | |
|---|---|---|---|
| 7,003,713 | B2 | 2/2006 | Rodgers |
| 7,472,332 | B2 | 12/2008 | Allen et al. |
| 2004/0098660 | A1 | 5/2004 | Dong et al. |
| 2005/0149823 | A1* | 7/2005 | Lee .............................. 714/758 |
| 2005/0232279 | A1 | 10/2005 | Brown et al. |
| 2009/0077661 | A1 | 3/2009 | Allen et al. |

OTHER PUBLICATIONS

USPTO Final Office Action for U.S. Appl. No. 11/189,895 dated Feb. 14, 2008, 10 pages.

USPTO Final Office Action for U.S. Appl. No. 11/189,895 dated Jul. 2, 2008, 6 pages.

USPTO Notice of Allowance for U.S. Appl. No. 11/189,895 dated Aug. 19, 2008, 6 pages.

Response to Office Action for U.S. Appl. No. 11/189,895 dated Jan. 10, 2008, 16 pages.

RCE and Amendment Pursuant to RCE for U.S. Appl. No. 11/189,895 dated May 13, 2008, 21 pages.

Response to Final Office Action for U.S. Appl. No. 11/189,895 dated Aug. 4, 2008, 6 pages.

"EMC Double Checksum Rapidly Monitor Data Integrity from Oracle Databases to Disk", EMC Corporation, 2005, 1 page, <http://www.emc.com/products/software/checksum.jsp>.

Chillingworth, Mark, "EMC and Oracle Double Check Their Sums", Image and Data Manager Online, Knapp Communications, Aug. 11, 2001, pp. 1-2, <http://www.idm.net.au/storypages/storydb_management.asp?id=2639.

"EMC Double Checksum for Oracle", Engineering White Paper, EMC Corporation, Nov. 1, 2001, pp. 1-8.

Tetzlaff, WH, "Performance Assist for Checksum DASD", IBM Technical Disclosure Bulletin 12-89, Aug. 2004, pp. 1-3.

Brown et al., "Oracle's Hardware Assisted Resilient Data (H.A.R.D.)", Bulletin, Web IV: View, Note: 158367.1, Nov. 16, 2001, pp. 1-5.

* cited by examiner

500 {
502 — file_handle = fopen_csum(file related details)
504 — return code = fwrite_csum(file_handle, data, length_of_data, checksum, controls to indicate the level of checksum verification)
506 — return code = fread_csum(file_handle, data_buffer, length_of_data_buffer, checksum_buffer, controls to indicate the level of checksum verification)

FIG. 6

APPARATUS FOR THE RELIABILITY OF HOST DATA STORED ON FIBRE CHANNEL ATTACHED STORAGE SUBSYSTEMS

This application is a continuation of application Ser. No. 11/189,895, Jul. 26, 2005, now U.S. Pat. No. 7,472,332 issued Dec. 30, 2008.

BACKGROUND OF THE INVENTION

1. Technical Field

The present invention relates to an improved data processing system, and in particular, to a method and apparatus for improving the reliability of host data stored on Fibre Channel attached storage subsystems.

2. Description of Related Art

Host data that is written to Fibre Channel or iSCSI attached storage subsystems may pass through many layers of the operating system before it is written to disk. At any point along the data transfer path, the data may be corrupted. As a result, corrupted data may be written to disk without the host's knowledge. The data corruption is not tracked at the time of occurrence and may lead to serious problems. For example, when corrupted data is later read from disk, no indication is provided to the host that the data has been previously corrupted, and the host assumes that the data is valid for use. The host's use of the corrupted data typically results in host errors. This situation also will lead to the scenario of not being able to pinpoint the source of corruption and not able to correct the problem.

Although the current art contains a number of solutions for improving the reliability of host data stored Fibre Channel attached storage subsystems, these solutions all contain significant shortcomings. For example, some host resource-managers (i.e. file systems, databases, etc.) compute and maintain checksums for data at the time the data is written to disk. A checksum is an integrity protection measure that is performed by adding up components in a string of data and storing the data. It may later be verified that the object was not corrupted by performing the same operation on the data, and checking the "sum". After reading previously written data but prior to using the data, the resource manager computes a checksum on the data read from disk and compares it to the checksum computed at the time data was written to disk. If the data has been corrupted at the time of the write, the resource manager detects the corruption through a miss-compare of the two checksum values and, consequently, does not use the corrupted data.

Within this solution, a number of major drawbacks exist. First, detection of the corruption occurs at the time the corrupted data is re-accessed from disk. This detection may be well after (days, months, years) the time at which the data was corrupted and at points in processing where it is difficult or impossible for the resource manager or an application on the host using the resource manager (i.e., file system) to recover from the corruption. Second, this solution is specific to a particular resource manager. For instance, as the application/database layer only manages this information by either storing it as part of the data or its headers, the information is not understood by other layers in the stack of software involved. Third, although this solution detects corruption, it does nothing in the way of identifying the point at which the corruption occurred. The only thing that is known is that the data was corrupted between the time a write request was issued for the data by the resource manager and the data was later read by the resource manager. Finally, the solution does not provide end-to-end data verification and has a window of vulnerability in which data corruption may occur and not be detected. For the most part, resource managers store application data. Once provided to the resource manager, application data may be corrupted while it resides with the resource manager, but prior to being written to disk by the resource manager. In this case, the corruption will not be detected and the application will be provided with corrupted data that is read from disk, with no indication given to the application that the data is invalid.

The current art provides another solution through the combined support of a specific host resource manager, in this case a database, and a Fibre Channel attached storage subsystem. The database data written to disk is of a fixed data and block format and contains a checksum value within the data format. Prior to writing a data block to disk, the database computes a checksum for the data contents of the block and records the computed checksum in the block. The data and block format of database are understood by the storage subsystems, and prior to satisfying a write request for a database block, the storage subsystem computes the checksum for the data contents of the block and compares this to the previously computed checksum. If the data has been corrupted in the write path, the storage subsystem detects this through a miss-compare of the two checksum values. If a corruption is detected, the storage subsystem does not write the block to disk, but rather signals an error condition back to the data base for this write request.

While this solution is an improvement over the previous solution described above in that the data corruption is detected earlier and affords better recoverability, it still has a number of major drawbacks. First, it imposes a fixed data and block format that includes a checksum value. Second, it imposes the requirement that a component outside of the database, namely, the storage subsystem, have intimate knowledge of the database-specific format. Third, this solution, like the previous solution above, also suffers from the problem that is does little in the way of identifying the source of the corruption. It narrows the point of corruption to operating systems and Fibre Channel input/output (I/O) paths involved in written the data, but these are significant paths, and in the case of the operating system, made up of many components.

A third solution in the current art is provided through an extension of the Fibre Channel protocol to include a cyclical redundancy check (CRC) control value for verifying packets. Similar in concept to a checksum, a CRC value is computed at the host for host data to be transmitted over the Fibre Channel link by the Fibre Channel adapter as part of writing host data to disk. The CRC value is sent along with the host data to the storage subsystem over the Fibre Channel. On receipt, the storage subsystem computes a CRC value for the received data and compares it against the received CRC. If the data has been corrupted during transmission, this is detected by a miss-compare of the CRC values and the storage subsystem does not write the data to disk and errors off the packet. The major drawback of this solution is that it does not provide end-to-end verification of data and only detects corruption that has occurred in the transmission of data across the Fibre Channel link.

Therefore, it would be advantageous to have an improved method for improving the reliability of host data stored on Fibre Channel attached storage subsystems. It would further be advantageous to have an end-to-end solution for data reliability between a host system and a Fiber Channel attached storage device without any restriction on the form, structure, or content of the data transacted.

SUMMARY OF THE INVENTION

The present invention provides a method, apparatus, and computer program product for improving the reliability of host data stored on Fibre Channel attached storage subsystems by performing end-to-end data integrity checks. With the present invention, when a read or write operation is initiated, an initial checksum for data in the read/write operation is generated and associated with the data, wherein the association exists through a plurality of layers of software and attached storage subsystems in the data processing system. The initial checksum is passed with the data in a read/write path. When a layer of software in the read/write path receives the initial checksum and data, the layer performs an integrity check of the data, wherein the integrity check includes generating a comparison checksum and determining whether the comparison checksum matches the initial checksum. If the initial and comparison checksums do not match, the read/write operation fails and the error is logged. If the initial and comparison checksums match, the integrity check is repeated through each layer of software and attached storage subsystems in the read/write path to enable detecting data corruption at the point of source.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
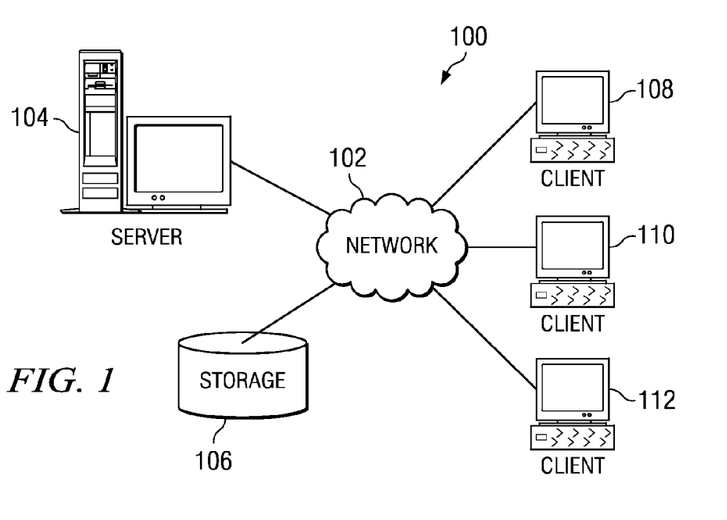
FIG. 1 depicts a pictorial representation of a distributed data processing system in which the present invention may be implemented.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 is connected to network 102 along with storage unit 106. In addition, clients 108, 110, and 112 are connected to network 102. These clients 108, 110, and 112 may be, for example, personal computers or network computers. In the depicted example, server 104 provides data, such as boot files, operating system images, and applications to clients 108-112. Clients 108, 110, and 112 are clients to server 104. Network data processing system 100 may include additional servers, clients, and other devices not shown. In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
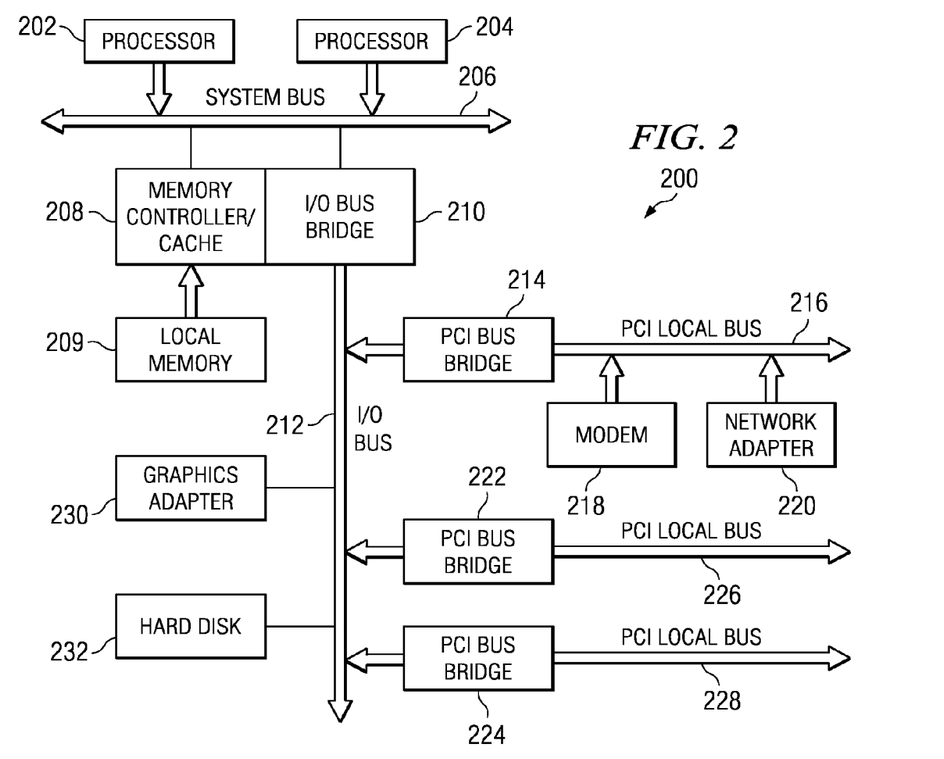
FIG. 2 is a block diagram of a data processing system that may be implemented as a server in accordance with a preferred embodiment of the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O Bus Bridge 210 is connected to system bus 206 and provides an interface to I/O bus 212. Memory controller/cache 208 and I/O Bus Bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to clients 108-112 in FIG. 1 may be provided through modem 218 and network adapter 220 connected to PCI local bus 216 through add-in connectors.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM eServer pSeries system, a product of International Business Machines Corporation in Armonk, N.Y., running the Advanced Interactive Executive (AIX) operating system or LINUX operating system.

Figure 3:
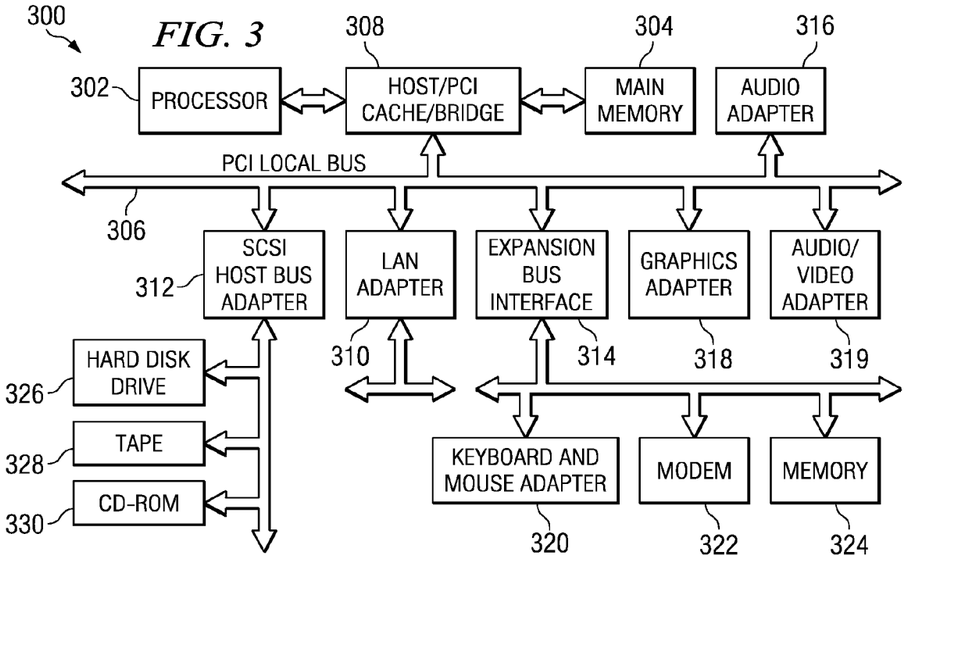
FIG. 3 is a block diagram of a data processing system that may be implemented as a client in accordance with a preferred embodiment of the present invention.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI Bridge 308. PCI Bridge 308 also may include an integrated memory controller and cache memory for processor 302. Additional connections to PCI local bus 306 may be made through direct component interconnection or through add-in boards. In the depicted example, local area network (LAN) adapter 310, small computer system interface (SCSI) host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. SCSI host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows XP, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented programming system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash read-only memory (ROM), equivalent nonvolatile memory, or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interfaces As a further example, data processing system 300 may be a personal digital assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

As previously mentioned, data reliability problems may occur when data is corrupted while on its way through the write path. Data corruption unnoticed at the time of store will show up during a later read of the data, and can be invariably non-recoverable. Even after using a series of problem determination efforts, it still may not be possible to identify the source of the data corruption. In some cases hardware will be suspected to be faulty, resulting in a hardware replacement, resulting in excessive costs. This situation is one of the most critical customer satisfaction issues.

Currently, Fiber Channel (FC) protocol does not accommodate end-to-end checksums that reach the operating system. Existing checksum based data integrity solutions require that checksums be embedded within the application data. Consequently, as the operating system is unaware of the checksum data, it is not able to verify the checksum in various layers of the operating system. Also, lack of awareness leads to the requirement that the data being transacted be of certain form and structure.

The mechanism of the present invention provides an end-to-end solution for data reliability between the host system and the FC attached storage device without any restriction on the form, structure, or content of the data transacted. With the present invention, a mechanism is provided for associating a checksum with application data, wherein the association exists through all of the layers of software involved in the host system, as well as through FC attached storage subsystem data transactions. The mechanism of the present invention allows for verifying the associated checksum in various software modules for data integrity. In this manner, corruption of data may be detected at the point of source.

The solution proffered by the present invention provides several advantages over existing systems. The mechanism of the present invention uses checksums to verify data and check for corruption, but does not impose any format restriction on the data. Verifiers of the data are not required to have specific knowledge of the data format. Checksum values are specified as a known data type and are provided with but are separate from the data at each level in the write path. In addition, windows of vulnerability within which data may be corrupted before the data is checksummed (resulting in corruption being undetected) are closed. Initial checksum values are computed and provided by high level producers (e.g., applications, etc.) of the data at the time the data is initially provided to resource managers (e.g., file system, logical volume manager, etc.). Furthermore, the data is verified at multiple levels in the write path, not just at the level of the storage subsystem. Using the specified initial checksum value and data for the write operation, each level of the system is capable of detecting data corruption and, in the case of detection, logging the event and failing the write to disk.

Figure 4:
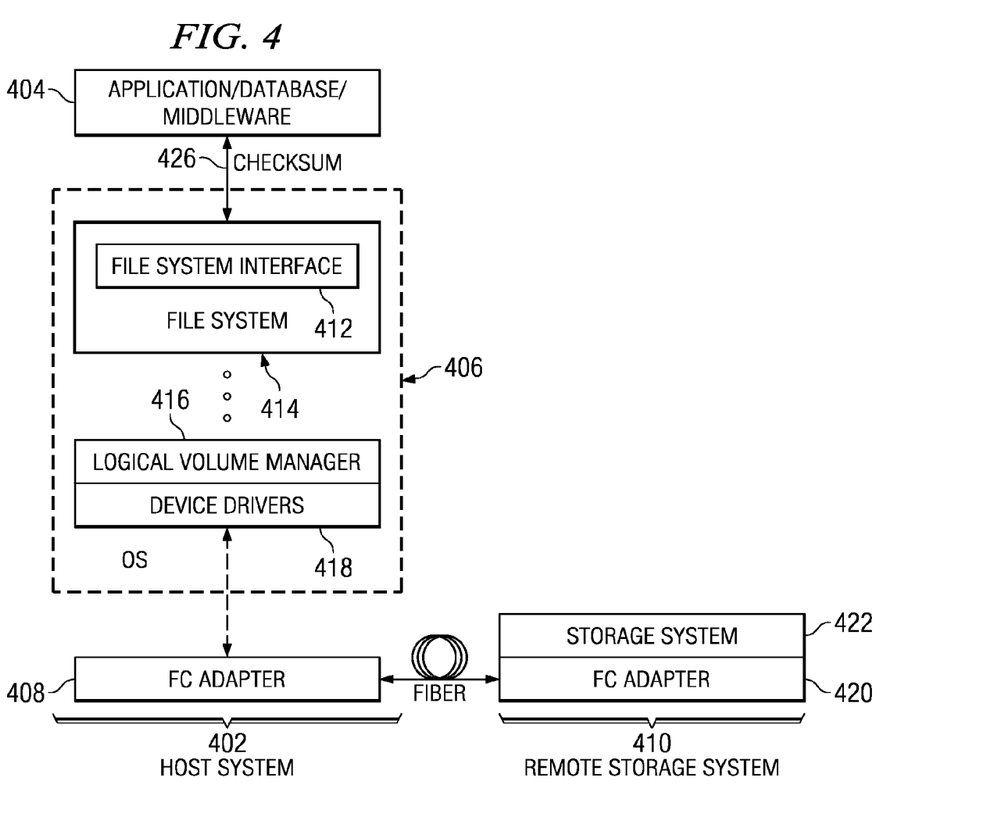
FIG. 4 is a block diagram illustrating an example application scenario with respect to the operating system in accordance with a preferred embodiment of the present invention.

Turning now to FIG. 4, a block diagram illustrating an example application scenario with respect to the operating system in accordance with a preferred embodiment of the present invention is shown. In particular, FIG. 4 depicts example components that may be used in a write/read operation. The example host system components shown in FIG. 4 may be implemented in a data processing system, such as data processing system 104 in FIG. 1. The remote storage system components shown in FIG. 4 may be implemented in a storage system, such as storage system 106 in FIG. 1.

In this illustrative example, host system 402 comprises resource manager 404 (e.g., an application or a database), operating system 406, and FC adapter 408. Resource manager 404 contains host data that may be sent to remote storage system 410 via operating system 406 and FC adapter 408. Resource manager 404 send host data to operating system 406 via file system interface 412. Operating system 406 comprises various layers, including file system 414, logical volume manager (LVM) 416, and FC device drivers 418. Operating system 406 is coupled to FC adapter 408.

Remote storage system 410 comprises FC adapter 420 and storage system 422. Data received from FC adapter 408 on host system 402 may be stored in storage system 422.

When a write operation within resource manager 404 is initiated, data from resource manager 404 will flow through the many layers of operating system 406 and eventually over the fiber to remote storage system 410. Data sent by resource manager 404 is associated with a checksum, such as checksum 424. Checksum 424 percolates through the various layers of operating system 406 (where the checksum may be verified in each layer) and then flows over the fiber to storage system 422 to be verified at that end. If a checksum error is detected in any of these checkpoints, the write operation may fail straight away. Similarly, read operations may verified at various points from the storage system to the application layer with an associated checksum calculated and sent by the storage system.

Fibre Channel communication between resource manager 404 and storage system 422 is enhanced to include data integrity related information along with the data in each data flow between the two entities. In other words, checksum 424 may be associated with the host data using current FC protocols. As current FC protocols provide for optional fields, one header in the fiber will be used to contain the checksum information associated with the data.

Operating system 406 provides necessary layer-to-layer changes to enable association of checksum information with the data as the data flows from file system 414 to LVM 416 and other layers within the operating system. For instance, changes may be made to LVM 416 and other such layers so that the data buffer will have space for the associated checksum value. These data buffers are passed from layer to layer and understood by various layers. Also, as part of the layer-to-layer interfaces, an additional control may be used to indicate whether or not the checksum verification should be performed in a particular layer. Operating system 406 also provides a new set of file system interfaces, such as file system interface 412, that perform the read and write operations with checksum information. The read/write operations may also be controlled by file input/output controls (IO-CTLS) with regards to levels of checksum verification performed in the operating system. These controls may designate which layers in the operating system should perform a check of the data. For example, a check may be performed in none, some, of all of the layers in the operating system. Operating system 406 may also provide interfaces to enable publishing of this capability, such that resource manager 404 may also make use of this selective verification. For example, the application may indicate through controls whether or not the application desires an exhaustive level of verification within the OS.

In addition, operating system embedded FC device driver layers 418 are made checksum data aware. This awareness may be achieved by modifying the interfaces to and from the device drivers to allow the interface to include the checksum related attributes. Such attributes include checksum information as well as controls for checksum verifications. FC device drivers 418 send and receive checksum information while interacting with FC adapter 408.

Resource manager 404 may make use of the new file system interfaces provided by operating system 406 to send and receive data with checksum information. Resource manager 404 generates the checksum and provides the checksum during write operations. If a write operation fails due to checksum errors, the resource manager may choose to enable more levels of checksum verification in the various layers of operating system 406 in order to detect the data corruption at the instant of occurrence. Similarly during data receptions, resource manager 404 may receive the data and associated checksum from storage system 422. Resource manager 404 generates a checksum for the received data and verifies its checksum against the received checksum. If the checksums do not match, the resource manager discards the data.

Remote storage system 410 is made aware of the optional headers over the Fibre Channel and may send and receive checksum information to and from host system 402. Remote storage system 410 lies remote to the server and typically will have its own OS and management capabilities. Consequently, remote storage system 410 may be modified to detect checksums and control information and act accordingly. These modifications may be performed for both write and read operations. Storage system 422 knows the checksum algorithm used by host system 402. Storage system 422 may know the algorithm used if both the server and the storage system use a common fixed algorithm. Alternatively, storage system 422 may know the algorithm if the algorithm type is sent as part of the packet structure. In either case, storage system 422 may use the algorithm to generate and verify checksums during write operations. If the checksums generated by storage system 422 and host system 402 differ, the write operation will fail and the host system is notified. During read operations, storage system 422 generates a checksum for the data and transmits the checksum along with the data to host system 402.

Figure 5:
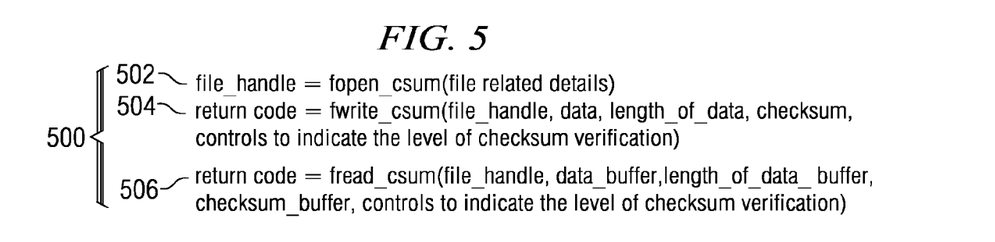
FIG. 5 illustrates an example application programming interface provided by the operating system in accordance with a preferred embodiment of the present invention.

FIG. 5 illustrates an example application programming interface (API) provided by the operating system in accordance with a preferred embodiment of the present invention. Application programming interface 500 shown in FIG. 5 may be implemented as file system interface 412 in FIG. 4. In particular, fopen_csum function 502 opens a file which name is stored in the filename string in the file related details. The file related details may also include one of various modes of access requested, such as 'r' for reading, 'w' to write, or 'a' to append. If the file has been successfully opened, the function will return a pointer to the file.

Return code 504 may be used to indicate whether a write is unsuccessful. For example, when a write operation is performed, the data may flow through various layers of the host system in the write path, such as from layer L1 to L2, L2 to L3, etc. If at any point the checksum verification fails, then return code 504 may be used by that layer performing the verification to return enough information as part of the failure to indicate the layer concerned as well as data related to failure (e.g., data, length of data, etc.). For example, if the checksum verification fails at layer L3, the information from return code 504 may help aid in debug efforts as to why the preceding layer L2 or current layer L3 created the failure, and further debugging may then be pursued in these layers. Similarly, return code 506 may be used to indicate the success of a read operation.

Figure 6:
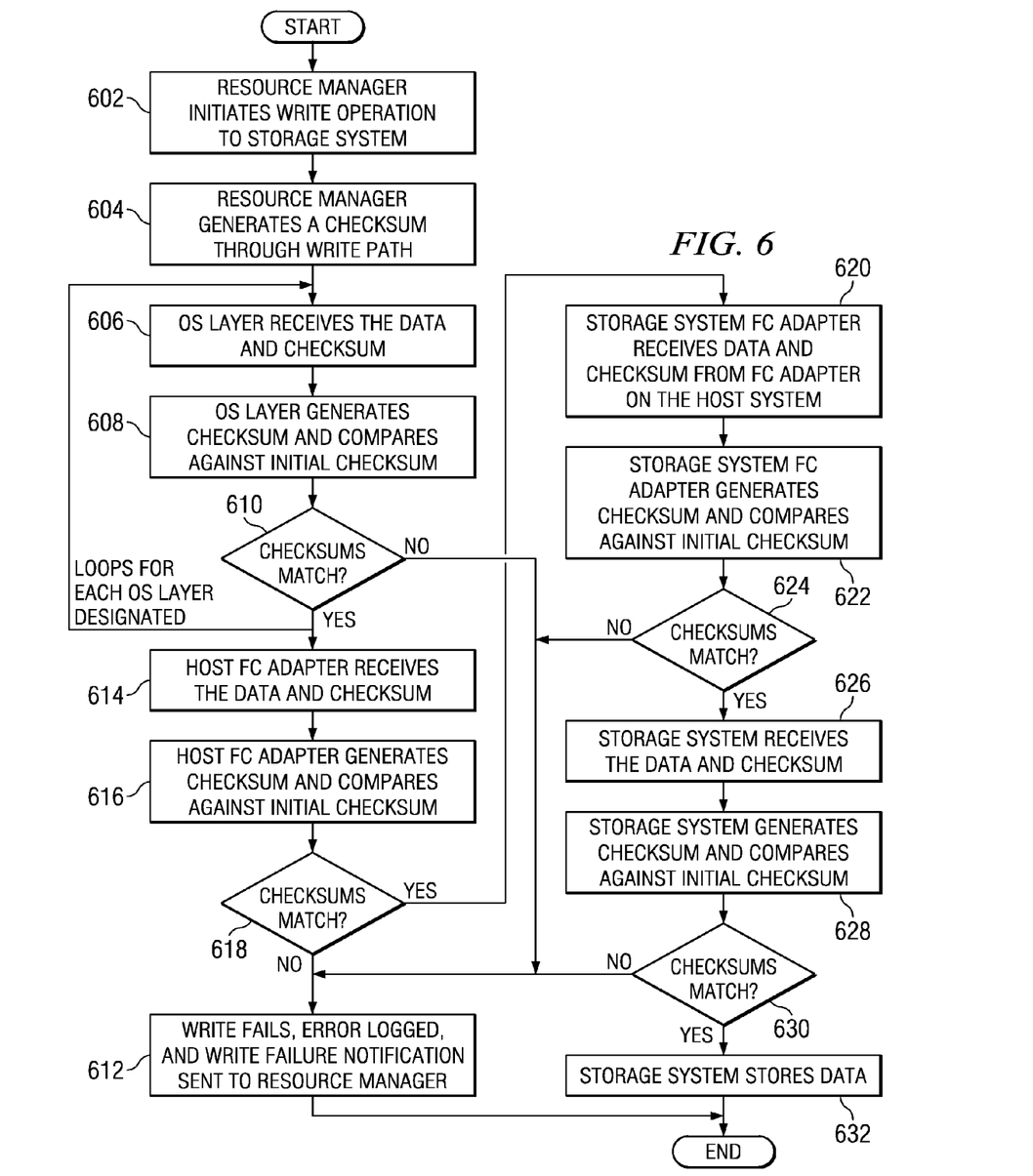
FIG. 6 is a flowchart of an exemplary process for improving the reliability of host data stored on Fibre Channel attached storage subsystems in accordance with a preferred embodiment of the present invention.

FIG. 6 is a flowchart of an exemplary process for improving the reliability of host data stored on Fibre Channel attached storage subsystems in accordance with a preferred embodiment of the present invention. The process described in FIG. 6 may be implemented in a distributed data processing system, such as network data processing system 100 shown in FIG. 1.

The process begins with a resource manager initiating a write operation to a storage system (step 602). The resource manager generates a checksum for the data and sends the data and associated checksum through the write path (step 604). The checksum may be sent with the data by placing the checksum in an optional header of the Fibre Channel.

When a layer in the operating system receives the data and checksum (step 606), the layer verifies the data integrity by generating a checksum and comparing its checksum against the initial checksum passed from the application (step 608). The operating system provides a new interface that is capable of receiving checksum information and allows checksum information to be passed through the operating system layers. Input/output controls may designate that all, some, or none of the layers perform the data integrity verification. Each designated layer knows the checksum algorithm used by the host application to generate the initial checksum. For instance, a common default method of algorithm may be used by both entities. Alternatively, the application may make a request to the OS to use a particular algorithm amongst a choice of algorithms supported by the OS. As previously mentioned, this request may be part of the request from the application to OS.

The layer then makes a determination as to whether checksum it generated and the initial checksum match (step 610). If the checksums do not match, the write fails, the write error is logged to a log file, and a write failure notification is sent to the application (step 612). The write may fail at the point where the checksum verification fails and the information about the failure is returned to the original requester. The write error log may include information regarding the location of the corruption. The write failure notification comprises a unique return code that flows back to the requester.

Turning back to step 610, if the checksums do match, the process returns to step 606 for each designated layer of the operating system.

When the FC adapter on the host system receives data and checksum from the operating system (step 614), the FC adapter also verifies the data integrity by generating a checksum and comparing its checksum against the initial checksum passed from the application (step 616). The FC adapter then makes a determination as to whether checksum it generated and the initial checksum match (step 618). If the checksums do not match, the write fails, the write error is logged to a log file, and a write failure notification is sent to the application (step 612). If the checksums do match, the data and checksum continues on the write path to the FC adapter on the storage system.

When the FC adapter on the storage system receives the data and checksum from the FC adapter on the host system, (step 620), the FC adapter generates a checksum and compares its checksum against the initial checksum passed from the application (step 622). The FC adapter then makes a determination as to whether the checksums match (step 624). If the checksums do not match, the write fails, the write error is logged to a log file, and a write failure notification is sent to the application (step 612). If the checksums do match, the data and checksum continues on the write path to the storage system.

When the storage system receives the data and checksum (step 626), the storage system generates its own checksum and compares its checksum against the initial checksum passed from the application (step 628). The storage system determines whether the checksums match (step 630). If the checksums do not match, the write fails, the write error is logged to a log file, and a write failure notification is sent to the application (step 612). If the checksums do match, the data and checksum is stored on disk (step 632).

Thus, the present invention provides an advantage over existing systems by providing end-to-end data integrity checks on Fibre Channel/iSCSI-based storage systems. The mechanism of the present invention prevents corrupted data from being stored on the disk by associating a checksum with application data, wherein the association exists through all of the layers of software involved in the host system, as well as through FC attached storage subsystem data transactions. In addition, if data corruption is detected, this detection may be made at the point of source. In this manner, without any restriction on the structure, form, or content of the host data, the present invention achieves highly reliable data transport both to and from the host and storage systems.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A data processing system for providing end-to-end data integrity checks, comprising:
   a host computer system that includes a resource manager, wherein the resource manager is an application that initiates a read/write operation, wherein the read/write operation includes generating an initial checksum for data in the read/write operation and associating the initial checksum with the data; and
   a remote storage device coupled to the host computer system that is separate from the host computer system, wherein the read/write operation uses the remote storage device;
   wherein the association exists through a plurality of layers of a software in the host computer system, wherein the resource manager sends the initial checksum with the data through the plurality of layers of the software in a read/write path, and wherein each one of the plurality of layers performs an integrity check; and
   wherein the integrity check includes each one of the plurality of layers generating a comparison checksum and each one of the plurality of layers determining whether the comparison checksum matches the initial checksum;
   wherein the read/write operation fails if the initial checksum and the comparison checksum generated by each one of the plurality of layers do not match; and
   wherein, in response to the initial checksum and the comparison checksum generated by a particular one of the plurality of layers being different, a return code is generated by the particular one of the plurality of layers, wherein the return code includes data related to a failure, and wherein the return code is sent to the resource manager.

2. The data processing system of claim 1, wherein determining whether the comparison checksum matches the initial checksum allows for detecting data corruption at a point of source.

3. The data processing system of claim 1, wherein failing the read/write operation includes logging an error.

4. The data processing system of claim 1, wherein the initial checksum is sent in a header of a communication medium.

5. The data processing system of claim 4, wherein the communication medium is one of Fibre Channel and iSCSI.

6. The data processing system of claim 1, wherein the integrity check is performed without imposing a restriction on structure, form, and content of the data.

7. The data processing system of claim 1, wherein the integrity check is performed, and wherein performing the integrity check prevents corrupted data from being stored on disk.

8. The data processing system according to claim 1, wherein the software is an operating system.

9. The data processing system according to claim 1, wherein the plurality of layers includes a file system, a logical volume manager, and a device driver.

10. The data processing system according to claim 9, further comprising:
wherein the file system generates a file system comparison checksum, determines whether the file system comparison checksum matches the initial checksum, and, responsive to the file system comparison checksum being different from the initial checksum, generates a file system return code that is sent to the resource manager;
wherein the logical volume manager generates a logical volume manager comparison checksum, determines whether the logical volume manager comparison checksum matches the initial checksum, and, responsive to the logical volume manager comparison checksum being different from the initial checksum, generates a logical volume manager return code that is sent to the resource manager; and
wherein the device driver generates a device driver comparison checksum, determines whether the device driver comparison checksum matches the initial checksum, and, responsive to the device driver comparison checksum being different from the initial checksum, generates a device driver return code that is sent to the resource manager.

11. The data processing system according to claim 1, further comprising:
wherein the host computer system includes a host communications adapter;
wherein the remote storage device includes a storage communications adapter and a storage system;
wherein the host communications adapter generates a host communications adapter comparison checksum, determines whether the host communications adapter comparison checksum matches the initial checksum, and, responsive to the host communications adapter comparison checksum being different from the initial checksum, generates a host communications adapter return code that is sent to the resource manager;
wherein the storage communications adapter generates a storage communications adapter comparison checksum, determines whether the storage communications adapter comparison checksum matches the initial checksum, and, responsive to the storage communications adapter comparison checksum being different from the initial checksum, generates a storage communications adapter return code that is sent to the resource manager; and
wherein the storage system generates a storage system comparison checksum, determines whether the storage system comparison checksum matches the initial checksum, and, responsive to the storage system comparison checksum being different from the initial checksum, generates a storage system return code that is sent to the resource manager.

12. A computer program product stored on a computer recordable media with computer usable program embodied thereon for providing end-to-end data integrity checks, the computer program product comprising:
instructions for performing a read/write operation, wherein the read/write operation is initiated by a resource manager that is an application, wherein the read/write operation includes generating an initial checksum for data in the read/write operation and associating the initial checksum with the data, wherein the association exists through a plurality of layers of a software in the host computer system, and wherein the resource manager is included in a host computer system, and further wherein the read/write operation uses a remote storage device that is coupled to the host computer system, and still further wherein the remote storage device is separate from the host computer system;
instructions for sending, by the resource manager, the initial checksum with the data through the plurality of layers of the software in a read/write path;
instructions for each one of the plurality of layers performing an integrity check, wherein the integrity check includes each one of the plurality of layers generating a comparison checksum and each one of the plurality of layers determining whether the comparison checksum matches the initial checksum;
instructions for failing the read/write operation if the initial checksum and the comparison checksum generated by each one of the plurality of layers do not match;
instructions, responsive to the initial checksum and the comparison checksum generated by a particular one of the plurality of layers being different, for generating a return code by the particular one of the plurality of layers, wherein the return code includes data related to a failure, and wherein the return code is sent to the resource manager.

13. The computer program product of claim 12, wherein determining whether the comparison checksum matches the initial checksum allows for detecting data corruption at a point of source.

14. The computer program product of claim 12, wherein failing the read/write operation includes logging an error.

15. The computer program product of claim 12, wherein the software is an operating system.

16. The computer program product of claim 12, wherein the plurality of layers includes a file system, a logical volume manager, and a device driver.

17. The computer program product of claim 16, further comprising:
instructions for using the file system to generate a file system comparison checksum, determine whether the file system comparison checksum matches the initial checksum, and, responsive to the file system comparison checksum being different from the initial checksum, generate a file system return code that is sent to the resource manager;

instructions for using the logical volume manager to generate a logical volume manager comparison checksum, determining whether the logical volume manager comparison checksum matches the initial checksum, and, responsive to the logical volume manager comparison checksum being different from the initial checksum, generating a logical volume manager return code that is sent to the resource manager; and instructions for using the device driver to generate a device driver comparison checksum, determining whether the device driver comparison checksum matches the initial checksum, and, responsive to the device driver comparison checksum being different from the initial checksum, generating a device driver return code that is sent to the resource manager.

18. The computer program product of claim 12, wherein the host computer system includes a host communications adapter, and wherein the remote storage device includes a storage communications adapter and a storage system, the computer program product further comprising:

instructions for using the host communications adapter to generate a host communications adapter comparison checksum, determine whether the host communications adapter comparison checksum matches the initial checksum, and, responsive to the host communications adapter comparison checksum being different from the initial checksum, generate a host communications adapter return code that is sent to the resource manager;

instructions for using the storage communications adapter to generate a storage communications adapter comparison checksum, determine whether the storage communications adapter comparison checksum matches the initial checksum, and, responsive to the storage communications adapter comparison checksum being different from the initial checksum, generate a storage communications adapter return code that is sent to the resource manager; and instructions for using the storage system to generate a storage system comparison checksum, determine whether the storage system comparison checksum matches the initial checksum, and, responsive to the storage system comparison checksum being different from the initial checksum, generate a storage system return code that is sent to the resource manager.

* * * * *